US011964179B2

(12) United States Patent
Monfils et al.

(10) Patent No.: US 11,964,179 B2
(45) **Date of Patent: *Apr. 23, 2024**

(54) FIRE-FIGHTING FOAM CONCENTRATE

(71) Applicant: Tyco Fire Products LP, Lansdale, PA (US)

(72) Inventors: JoAnna M. Monfils, Peshtigo, WI (US); John P. Libal, Peshtigo, WI (US); Blake H. Bomann, Greenville, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,655

(22) Filed: Oct. 17, 2022

(65) Prior Publication Data

US 2023/0051502 A1 Feb. 16, 2023

Related U.S. Application Data

(63) Continuation of application No. 17/722,991, filed on Apr. 18, 2022, now Pat. No. 11,497,952, which is a continuation-in-part of application No. 17/694,652, filed on Mar. 14, 2022.

(60) Provisional application No. 63/297,384, filed on Jan. 7, 2022, provisional application No. 63/288,020, filed on Dec. 10, 2021, provisional application No. 63/288,024, filed on Dec. 10, 2021, provisional application No. 63/288,026, filed on Dec. 10, 2021, provisional application No. 63/245,028, filed on Sep. 16, 2021, provisional application No. 63/215,006, filed on Jun. 25, 2021, provisional application No. 63/188,633, filed on May 14, 2021.

(51) Int. Cl.
*A62D 1/02* (2006.01)
*A62D 1/00* (2006.01)

(52) U.S. Cl.
CPC ......... *A62D 1/0071* (2013.01); *A62D 1/0042* (2013.01)

(58) Field of Classification Search
CPC ............................ A62D 1/0071; A62D 1/0042
See application file for complete search history.

(56) References Cited

U.S. PATENT DOCUMENTS

| | | | |
|---|---|---|---|
| 3,956,138 | A | 5/1976 | Crockett |
| 4,060,489 | A | 11/1977 | Chiesa, Jr. |
| 4,398,605 | A | 8/1983 | Conklin et al. |
| 4,410,508 | A | 10/1983 | Brown et al. |
| 5,218,021 | A | 6/1993 | Clark et al. |
| 5,225,095 | A | 7/1993 | Dimaio et al. |
| 5,296,164 | A | 3/1994 | Thach et al. |
| 5,391,721 | A | 2/1995 | Hanen et al. |
| 5,434,192 | A | 7/1995 | Thach et al. |
| 5,496,475 | A | 3/1996 | Jho et al. |
| 5,616,273 | A | 4/1997 | Clark et al. |
| 5,706,895 | A | 1/1998 | Sydansk |
| 5,882,541 | A | 3/1999 | Achtmann |
| 5,997,758 | A | 12/1999 | Barbarin et al. |
| 6,262,128 | B1 | 7/2001 | Stern et al. |
| 6,599,872 | B1 | 7/2003 | Hubert et al. |
| 7,005,082 | B2 | 2/2006 | Clark |
| 7,011,763 | B2 | 3/2006 | Clark |
| 7,135,125 | B2 | 11/2006 | Clark |
| 7,172,709 | B2 | 2/2007 | Clark |
| 7,199,083 | B2 | 4/2007 | Zevallos |
| 7,271,133 | B2 | 9/2007 | Weaver et al. |
| 7,334,640 | B2 | 2/2008 | Hanes et al. |
| 7,381,696 | B2 | 6/2008 | Hubert et al. |
| 7,541,316 | B2 | 6/2009 | Maresh |
| 7,569,155 | B2 | 8/2009 | Schaefer |
| 7,588,645 | B2 | 9/2009 | Griese et al. |
| 7,888,297 | B2 | 2/2011 | Hanes et al. |
| 7,888,308 | B2 | 2/2011 | Swazey |
| 7,994,111 | B2 | 8/2011 | Caggioni et al. |
| 8,043,999 | B2 | 10/2011 | Sullivan et al. |

(Continued)

FOREIGN PATENT DOCUMENTS

| | | | |
|---|---|---|---|
| CN | 1599633 | A | 3/2005 |
| CN | 101198381 | A | 6/2008 |
| CN | 105056458 | A | 11/2015 |
| CN | 112675469 | A | 4/2021 |
| CN | 112694638 | A | 4/2021 |
| WO | WO-2008/058324 | A1 | 5/2008 |

(Continued)

OTHER PUBLICATIONS

Derwent Acc. No. 2020-69248T; Chai, et al; "Composition with Foaming Properties"; Derwent; Abstract for WO2020/149733A1; dated Jul. 23, 2020; 4 pages.
International Search Report and Written Opinion on PCT Appl. Ser. No. PCT/IB2022/053615 dated Jul. 26, 2022 (13 pages).
International Search Report and Written Opinion on PCT Appl. Ser. No. PCT/IB2022/053618 dated Jul. 22, 2022 (13 pages).
International Search Report and Written Opinion on PCT Appl. Ser. No. PCT/IB2022/053619 dated Jul. 29, 2022 (14 pages).
International Search Report and Written Opinion on PCT Appl. Ser. No. PCT/IB2022/053620 dated Jul. 29, 2022 (14 pages).
International Search Report and Written Opinion on PCT Appl. Ser. No. PCT/IB2022/053621 dated Jul. 29, 2022 (15 pages).
U.S. Appl. No. 18/455,280, filed Aug. 24, 2023, Monfils et al.

*Primary Examiner* — Andrew J. Oyer
(74) *Attorney, Agent, or Firm* — Foley & Lardner LLP

(57) ABSTRACT

A method of fighting a fire, the method includes aerating a firefighting foam composition to form an aerated firefighting foam; administering the aerated firefighting foam to a fire or applying the aerated firefighting foam to a surface of a volatile flammable liquid; wherein the firefighting foam composition includes a surfactant component comprising an anionic surfactant, a zwitterionic surfactant, optionally a nonionic surfactant, or a mixture of any two or more thereof; an aliphatic alcohol-based component comprising at least two compounds selected from $C_8$-$C_{14}$-aliphatic alcohols and ethoxylates of $C_{10}$-$C_{14}$-aliphatic alcohols having an average of no more than about 6 ethylene oxide units; and at least about 30 wt. % water.

18 Claims, No Drawings

(56) References Cited

U.S. PATENT DOCUMENTS

| | | | |
|---|---|---|---|
| 8,076,270 B2 | 12/2011 | Smith et al. | |
| 8,207,094 B2 | 6/2012 | Hutchins et al. | |
| 8,298,436 B2 | 10/2012 | Michael | |
| 8,366,955 B2 | 2/2013 | Thomas et al. | |
| 8,413,721 B2 | 4/2013 | Welton et al. | |
| 8,524,104 B1 | 9/2013 | Michael | |
| 8,703,691 B2 | 4/2014 | Caggioni et al. | |
| 8,772,359 B2 | 7/2014 | Swazey | |
| 8,783,374 B2 | 7/2014 | Rains et al. | |
| 9,045,716 B2 | 6/2015 | Swazey et al. | |
| 9,259,602 B2 | 2/2016 | Robinet et al. | |
| 9,289,636 B2 | 3/2016 | Mathis | |
| 9,420,784 B2 | 8/2016 | Vanlaer et al. | |
| 9,487,661 B2 | 11/2016 | Johnson et al. | |
| 9,662,522 B2 | 5/2017 | Liu et al. | |
| 9,669,246 B2 | 6/2017 | Bowen et al. | |
| 9,675,828 B1 | 6/2017 | Sery | |
| 9,687,686 B2 | 6/2017 | Blunk et al. | |
| 9,776,029 B2 | 10/2017 | Izumida et al. | |
| 9,956,447 B2 | 5/2018 | Martin et al. | |
| 9,956,448 B2 | 5/2018 | Martin | |
| 10,030,214 B2 | 7/2018 | Swazey et al. | |
| 10,071,273 B2 | 9/2018 | Hansen et al. | |
| 10,159,863 B2 | 12/2018 | Mariampillai et al. | |
| 10,173,089 B2 | 1/2019 | Xie | |
| 10,214,708 B2 | 2/2019 | Swazey et al. | |
| 10,328,297 B2 | 6/2019 | Bowen et al. | |
| 10,335,624 B2 | 7/2019 | Libal | |
| 10,369,394 B2 | 8/2019 | Bowen | |
| 10,369,395 B2 | 8/2019 | Bowen et al. | |
| 10,443,019 B2 | 10/2019 | Fossum et al. | |
| 10,457,900 B2 | 10/2019 | Fossum et al. | |
| 10,494,592 B2 | 12/2019 | Applegate et al. | |
| 10,518,120 B2 | 12/2019 | Pai et al. | |
| 10,625,108 B2 | 4/2020 | Mariampillai et al. | |
| 10,653,910 B2 | 5/2020 | Da Costa et al. | |
| 10,780,305 B2 | 9/2020 | Xie et al. | |
| 10,870,030 B2 | 12/2020 | Libal | |
| 10,940,352 B2 | 3/2021 | Worsman | |
| 11,065,490 B2 | 7/2021 | Lavergne et al. | |
| 11,173,334 B2 | 11/2021 | Xie et al. | |
| 11,497,952 B1 | 11/2022 | Monfils et al. | |
| 11,666,791 B2 | 6/2023 | Monfils et al. | |
| 11,673,010 B2 | 6/2023 | Monfils et al. | |
| 11,673,011 B2 | 6/2023 | Monfils et al. | |
| 11,771,939 B2 | 10/2023 | Monfils et al. | |
| 2002/0014610 A1 | 2/2002 | Tanaka et al. | |
| 2003/0201419 A1 | 10/2003 | Tanaka et al. | |
| 2004/0006175 A1 | 1/2004 | Diener et al. | |
| 2005/0113272 A1* | 5/2005 | Yeung | A61Q 9/04 510/235 |
| 2007/0256836 A1 | 11/2007 | Welton et al. | |
| 2008/0108541 A1 | 5/2008 | Swazey | |
| 2008/0196908 A1 | 8/2008 | Schaefer | |
| 2011/0097294 A1 | 4/2011 | Anthony et al. | |
| 2013/0313465 A1 | 11/2013 | Podella et al. | |
| 2014/0138104 A1 | 5/2014 | Robinet et al. | |
| 2016/0107015 A1 | 4/2016 | Cheng | |
| 2017/0056698 A1 | 3/2017 | Pai et al. | |
| 2017/0259099 A1 | 9/2017 | Blunk et al. | |
| 2018/0325141 A1 | 11/2018 | Nakajima | |
| 2018/0361185 A1 | 12/2018 | Siem | |
| 2019/0008187 A1 | 1/2019 | Konda et al. | |
| 2019/0262647 A1 | 8/2019 | Havelka-Rivard et al. | |
| 2019/0314660 A1 | 10/2019 | Chirac et al. | |
| 2020/0094093 A1 | 3/2020 | Worsman et al. | |
| 2020/0101340 A1 | 4/2020 | Worsman | |
| 2020/0139180 A1 | 5/2020 | Lovas | |
| 2020/0206552 A1 | 7/2020 | Mariampillai et al. | |
| 2020/0215372 A1 | 7/2020 | Lavergne et al. | |
| 2020/0368570 A1 | 11/2020 | Hodgen et al. | |
| 2021/0009787 A1 | 1/2021 | Hulbert et al. | |
| 2021/0046347 A1 | 2/2021 | Lavergne et al. | |
| 2021/0128431 A1 | 5/2021 | Sartingen et al. | |
| 2021/0146182 A1 | 5/2021 | Hugener | |
| 2021/0154512 A1 | 5/2021 | Libal | |
| 2021/0187337 A1 | 6/2021 | Worsman | |
| 2021/0283449 A1 | 9/2021 | Lavergne et al. | |
| 2022/0134158 A1 | 5/2022 | Havelka-Rivard et al. | |
| 2022/0362601 A1 | 11/2022 | Monfils et al. | |
| 2022/0362602 A1 | 11/2022 | Monfils et al. | |
| 2022/0362603 A1 | 11/2022 | Monfils et al. | |
| 2022/0362604 A1 | 11/2022 | Monfils et al. | |
| 2022/0411644 A1 | 12/2022 | Rhoades et al. | |
| 2023/0256280 A1 | 8/2023 | Monfils et al. | |
| 2023/0256281 A1 | 8/2023 | Monfils et al. | |
| 2023/0372757 A1 | 11/2023 | Monfils et al. | |
| 2023/0405382 A1 | 12/2023 | Monfils et al. | |

FOREIGN PATENT DOCUMENTS

| | | |
|---|---|---|
| WO | WO-2011/050980 A2 | 5/2011 |
| WO | WO-2016/075480 A1 | 5/2016 |
| WO | WO-2016/082041 A1 | 6/2016 |
| WO | WO-2018/022763 A1 | 2/2018 |
| WO | WO-2018/134393 A1 | 7/2018 |
| WO | WO-2018/234647 A1 | 12/2018 |
| WO | WO-2019/202045 A1 | 10/2019 |
| WO | WO-2020/033255 A1 | 2/2020 |
| WO | WO-2020/084277 A1 | 4/2020 |
| WO | WO-2020/109654 A1 | 6/2020 |
| WO | WO-2020/144579 A1 | 7/2020 |
| WO | WO-2020/149733 A1 | 7/2020 |
| WO | WO-2020/217126 A1 | 10/2020 |
| WO | WO-2020/247780 A1 | 12/2020 |
| WO | WO-2021/099308 A1 | 5/2021 |
| WO | WO-2022/094399 | 5/2022 |
| WO | WO-2022/238783 A1 | 11/2022 |
| WO | WO-2022/238784 A1 | 11/2022 |
| WO | WO-2022/238785 A1 | 11/2022 |
| WO | WO-2022/238786 A1 | 11/2022 |
| WO | WO-2022/238787 A1 | 11/2022 |
| WO | WO-2022/240478 A1 | 11/2022 |
| WO | WO-2022/240479 A1 | 11/2022 |
| WO | WO-2022/240480 A1 | 11/2022 |
| WO | WO-2022/240481 A1 | 11/2022 |

* cited by examiner

FIRE-FIGHTING FOAM CONCENTRATE

CROSS-REFERENCE TO RELATED APPLICATIONS

This application is a continuation of U.S. patent application Ser. No. 17/722,991, filed on Apr. 18, 2022, which is a continuation-in-part of U.S. patent application Ser. No. 17/694,652, filed on Mar. 14, 2022, which claims the benefit of priority to U.S. Provisional Patent Application Nos. 63/188,633, filed on May 14, 2021; 63/215,006, filed on Jun. 25, 2021; 63/245,028, filed Sep. 16, 2021; 63/288,024, filed on Dec. 10, 2021; 63/288,020, filed on Dec. 10, 2021; and 63/288,026, filed on Dec. 10, 2021. U.S. patent application Ser. No. 17/722,991 also claims the benefit of priority to U.S. Provisional Patent Application No. 63/297,384, filed on Jan. 7, 2022. The contents of each of the above applications are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions may include fluorinated surfactants. There is a strong desire in the marketplace to replace these fluorinated firefighting products with non-fluorinated products. There is therefore a continuing need to produce non-fluorinated firefighting compositions, also known as synthetic fluorine-free foams or SFFF that can be deployed to fight Class A and Class B fires.

Foam-forming firefighting compositions may be exposed to and/or stored under conditions where the compositions may be subject to relatively low temperatures, e.g., temperatures close to or below freezing (0° C.). Foam-forming firefighting compositions that exhibit good stability under such low temperature conditions, while still maintaining superior fire suppression performance, are desirable.

SUMMARY

The present application is directed to aqueous concentrates, which can be diluted with an aqueous diluent to provide a foam precursor composition, which may be aerated to form a firefighting foam. The present aqueous firefighting concentrates include an aliphatic alcohol-based component and a surfactant component containing one or more of an anionic surfactant, a zwitterionic surfactant, and optionally a nonionic surfactant. The aqueous firefighting concentrates may also include an organic solvent, e.g., a water-miscible organic solvent such as an alkylene glycol, glycerol, a water-soluble polyethylene glycol and/or a glycol ether. The concentrate may also contain a polysaccharide thickener, such as a natural gum. The composition may be substantially free of any fluorinated compound(s), e.g., contain no more than 0.01 wt. % fluorinated surfactant(s)/fluorinated compound(s) and, often, is completely free of any fluorinated surfactant or other fluorinated compound. In some embodiments, the concentrates and/or compositions are free of nonionic surfactants.

An aqueous firefighting foam concentrate may include a surfactant component, which includes an aliphatic alcohol-based component and one or more of an anionic surfactant, a zwitterionic surfactant and optionally a nonionic surfactant. The aliphatic alcohol-based component may include at least two alcohols and/or alcohol ethoxylates. For example, the concentrate may include two or more alcohol-based compounds, such as aliphatic alcohols and/or ethoxylates of aliphatic alcohols. The aliphatic alcohol ethoxylates may have an average of no more than about 6 and, often no more than about 4 ethylene oxide units. The aqueous concentrates may contain a substantial amount of water—i.e. at least about 30 wt. %, at least about 50 wt. %, and or more than about 60 wt. %, 65 wt. % or even higher. The composition may be substantially free of any fluorinated compound, e.g., contain no more than 0.01 wt. % fluorinated surfactant(s) and, often, is completely free of any fluorinated surfactant or other fluorinated compound. In some embodiments, the concentrates and/or compositions are free of nonionic surfactants.

In another aspect, an aqueous fire-fighting foam concentrate includes a) a surfactant component, which includes one or more of an anionic surfactant, a zwitterionic surfactant, and optionally a nonionic surfactant, b) an aliphatic alcohol-based component, which includes at least two alcohol-based compounds such as $C_{8-14}$-aliphatic alcohols and ethoxylates of $C_{10-14}$-aliphatic alcohols having an average of no more than about 6 ethylene oxide units, and c) at least about 30 wt. % water. The concentrate generally contains no more than 0.01 wt. % fluorinated surfactant and, often, is completely free of any fluorinated surfactant or other fluorinated compound. The composition may be substantially free of any fluorinated compound, e.g., contain no more than 0.01 wt. % fluorinated surfactant(s) and, often, is completely free of any fluorinated surfactant or other fluorinated compound. In some embodiments, the concentrates and/or compositions are free of nonionic surfactants.

In another aspect, an aqueous fire-fighting foam concentrate includes a) about 0.1 to 5 wt. % of a polysaccharide thickener, b) about 5 to 50 wt. % of a surfactant component, which includes two or more of an anionic surfactant, a zwitterionic surfactant, and optionally a nonionic surfactant, c) about 0.1 to 5 wt. % of an aliphatic alcohol-based component, which includes at least two compounds selected from $C_{8-14}$-aliphatic alcohols and ethoxylates of $C_{10-14}$-aliphatic alcohols having an average of no more than about 6 ethylene oxide units, d) about 1 to 30 wt. % of a water-miscible organic solvent; and e) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound. In some embodiments, the concentrates and/or compositions are free of nonionic surfactants.

In another aspect, an aqueous fire-fighting foam concentrate includes a) a polysaccharide thickener, which includes one or more of xanthan gum, welan gum, succinoglycan and diutan gum, b) an alkyl sulfate anionic surfactant; c) an alkyl polyglycoside nonionic surfactant; d) an aliphatic alcohol-based component, which includes at least two compounds selected from capryl alcohol, lauryl alcohol, a lauryl alcohol ethoxylate having an average of about 1 to 4 ethylene oxide units; e) water-miscible organic solvent, which comprises propylene glycol and butyl carbitol, and f) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound.

In another aspect, an aqueous fire-fighting foam concentrate includes a) a polysaccharide thickener, which includes xanthan gum and/or diutan gum, b) an alkyl sulfate anionic surfactant; c) an alkyl polyglycoside nonionic surfactant; d) an aliphatic alcohol-based component, which includes at least two compounds selected from capryl alcohol, lauryl alcohol, a lauryl alcohol ethoxylate having an average of about 1 to 4 ethylene oxide units; e) water-miscible organic solvent, which comprises propylene glycol and butyl carbitol, and f) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound.

In another aspect, an aqueous fire-fighting foam concentrate includes a) a polysaccharide thickener, which includes xanthan gum and/or succinoglycan, b) an alkyl sulfate anionic surfactant; c) an alkyl polyglycoside nonionic surfactant; d) an aliphatic alcohol-based component, which includes at least two compounds selected from capryl alcohol, lauryl alcohol, a lauryl alcohol ethoxylate having an average of about 1 to 4 ethylene oxide units; e) water-miscible organic solvent, which comprises propylene glycol and butyl carbitol, and f) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound.

In another aspect, an aqueous fire-fighting foam concentrate includes a polysaccharide thickener; a surfactant component, which includes one or more of an anionic surfactant, a zwitterionic surfactant, and optionally a nonionic surfactant; an aliphatic alcohol-based component, which includes at least one ethoxylate of a $C_{10-14}$-aliphatic alcohol having an average of no more than about 6 and, often, no more than about 4 ethylene oxide units; a water-miscible organic solvent, and at least about 30 wt. % or at least about 50 wt. % water. The composition may be substantially free of any fluorinated compound, e.g., contain no more than 0.01 wt. % fluorinated surfactant(s) and, often, is completely free of any fluorinated surfactant or other fluorinated compound. In some embodiments, the concentrates and/or compositions are free of nonionic surfactants.

In another aspect, an aqueous fire-fighting foam concentrate includes a) about 1-4 wt. % polysaccharide thickener, which includes one or more of xanthan gum, welan gum, succinoglycan and diutan gum, b) about 5-15 wt. % $C_{8-12}$-alkyl sulfate anionic surfactant, c) about 3-10 wt. % $C_{8-10}$-alkyl polyglycoside nonionic surfactant, c) about 0.5-3 wt. % of an aliphatic alcohol-based component, which comprises at least two compounds selected from capryl alcohol, lauryl alcohol, and a lauryl alcohol ethoxylate having an average of about 1 to 4 ethylene oxide units, d) about 10-20 wt. % propylene glycol, e) butyl carbitol, and f) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound.

In a further aspect, a firefighting foam concentrate may include an aliphatic alcohol-based component; a surfactant component containing one or more of an anionic surfactant, a zwitterionic surfactant, and optionally a nonionic surfactant; and a microfibrous cellulose. In such cases, the inclusion of a microfibrous cellulose suspension agent may aid in stabilizing the resulting dispersion. The concentrates may be substantially free of any fluorinated compound(s), e.g., contain no more than 0.01 wt. % fluorinated surfactant(s)/fluorinated compound(s) and, often, is completely free of any fluorinated surfactant or other fluorinated compound. In some embodiments, the concentrates and/or compositions are free of nonionic surfactants.

In a further aspect, a method of fighting a fire includes aerating a firefighting foam composition to form an aerated firefighting foam; and administering the aerated firefighting foam to a fire or applying the aerated firefighting foam to a surface of a volatile flammable liquid. The firefighting foams for use in the method include any firefighting foam compositions or concentrates as described herein.

DETAILED DESCRIPTION

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or illustrative language (e.g., "such as") provided herein, is intended merely to better illuminate the embodiments and does not pose a limitation on the scope of the claims unless otherwise stated. No language in the specification should be construed as indicating any non-claimed element as essential.

Aqueous firefighting foam concentrates may include an aliphatic alcohol-based component and a surfactant component containing one or more of an anionic surfactant, a zwitterionic surfactant, and optionally a nonionic surfactant. The aqueous firefighting concentrates may also include an organic solvent, e.g., a water-miscible organic solvent, and/or a polysaccharide thickener, such as a natural gum. The composition may be substantially free of any fluorinated surfactant(s) compound. In some embodiments, the concentrates and/or compositions are free of nonionic surfactants.

In one aspect, an aqueous firefighting foam concentrate includes an aliphatic alcohol-based component, such as an aliphatic alcohol and/or an aliphatic alcohol ethoxylate. For example, the concentrate may include an aliphatic alcohol-based component including an aliphatic alcohol having 8 to 14 carbon atoms or an aliphatic alcohol ethoxylate having 10 to 16 carbon atoms in its alcohol portion. Alternatively, the concentrate may include a mixture of an aliphatic alcohol having 8 to 14 carbon atoms and an aliphatic alcohol ethoxylate having 10 to 16 carbon atoms in its alcohol portion. In such mixtures, the ratio of aliphatic alcohol to aliphatic alcohol ethoxylate may be in range of about 10:1 to 1:10, or about 5:1 to 1:5, about 2:1 to 1:2, about 1.5:1 to 1:1:5, or about 1:1. The foam concentrate may suitably include about 0.1 to 5 wt. %, about 0.5 to 3 wt. %, or about 0.5 to 2 wt. % of the aliphatic alcohol-based nonionic surfactant. The aliphatic alcohol ethoxylate may have an average degree of polymerization (i.e., the average number of ethylene oxide units) of about 0.5-6.0 and often of no more than about 4.0, or no more than about 3.0 or no more than about 2.0. Aliphatic alcohols, which include a linear $C_{8-14}$-aliphatic alcohol, such as a $C_{8-14}$-fatty alcohol, are suitable for use as a nonionic surfactant in the present concentrates. Suitable examples of such alcohols include one or more of octyl alcohol, decyl alcohol, lauryl alcohol and myristyl alcohol. The foam concentrate may include an aliphatic alcohol ethoxylate having an average of no more than about 3 ethylene oxide units. The aliphatic alcohol portion of such ethoxylates typically has about 10 to 16 carbon atoms. Suitable examples include decyl alcohol ethoxylates, lauryl alcohol ethoxylates, myristyl alcohol ethoxylates, and/or cetyl alcohol ethoxylates. Such ethoxylates may have an average of no more than about 3 ethylene oxide units, no more than about 2.0 ethylene oxide units, no more than about 1.5 ethylene oxide units and, in some instances, no more than about 1 ethylene oxide units. In one suitable embodiment, the aliphatic alcohol ethoxylate comprises an ethoxylate of a linear $C_{8-14}$-aliphatic alcohol having no more than about 1.2 ethylene oxide units.

The aliphatic alcohol-based component may include an aliphatic alcohol ethoxylate. The aliphatic alcohol ethoxylate may have an average degree of polymerization (i.e., the average number of ethylene oxide units) of about 0.5-6.0 and often of no more than about 4.0, or no more than about 3.0 or no more than about 2.0. Aliphatic alcohols, which include a linear $C_{8-14}$-aliphatic alcohol, such as a $C_{8-14}$-fatty alcohol, are suitable for use as a nonionic surfactant in the present concentrates. Suitable examples of such alcohols include one or more of octyl alcohol, decyl alcohol, lauryl alcohol and myristyl alcohol. The foam concentrate may include an aliphatic alcohol ethoxylate having an average of no more than about 3 ethylene oxide units. The aliphatic alcohol portion of such ethoxylates typically has about 10 to 16 carbon atoms. Suitable examples include decyl alcohol ethoxylates, lauryl alcohol ethoxylates, myristyl alcohol ethoxylates, and/or cetyl alcohol ethoxylates. Such ethoxylates may have an average of no more than about 3 ethylene oxide units, no more than about 2.0 ethylene oxide units, no more than about 1.5 ethylene oxide units and, in some instances, no more than about 1 ethylene oxide units. In one suitable embodiment, the aliphatic alcohol ethoxylate comprises an ethoxylate of a linear $C_{8-14}$-aliphatic alcohol having no more than about 1.2 ethylene oxide units.

The aqueous fire-fighting foam concentrates may include an anionic surfactant. The anionic surfactant may suitably include an alkyl sulfate surfactant, an alkyl sulfonate surfactant, alkyl ether sulfate surfactant and/or an alkyl ether sulfonate surfactant. The anionic surfactant typically includes an alkyl sulfate surfactant and/or an alkyl sulfonate surfactant. The alkyl sulfate salt surfactant typically includes include a $C_{8-12}$-alkyl sulfate salt. Suitable examples of the $C_{8-12}$-alkyl sulfate salt include a dodecyl sulfate salt, a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate ammonium salt, such as an ammonium decyl sulfate, ammonium octyl sulfate, ammonium lauryl sulfate, or a combination thereof. One suitable example is the triethanolamine salt of lauryl sulfate. In embodiments that include the anionic surfactant, the aqueous firefighting foam concentrate may include about 1 to 20 wt. % or about 5 to 15 wt. % of the anionic surfactant. Typically, the aqueous firefighting foam concentrate may include about 5 to 15 wt. %, about 5 to 10 wt. % and, in some instances, about 7 to 8 wt. % of a the anionic surfactant. In some embodiments, the foam concentrate includes about 7.8 wt. % $C_{8-12}$-alkyl sulfate anionic surfactants.

In some embodiments, the aqueous fire-fighting foam concentrate may include an anionic surfactant comprising a $C_{8-14}$-alkyl sulfate salt and/or a $C_{8-14}$-alkyl sulfonate salt. In some embodiments, the aqueous fire-fighting foam concentrate may include an anionic surfactant, which comprises one or more surfactants selected from $C_{8-12}$-alkyl sulfate salts and/or a $C_{8-12}$-alkyl sulfonate salts. For example, one or more of octyl sulfate salts, decyl sulfate salts, dodecyl sulfate salts, and tetradecyl sulfate salts may be suitable for use as anionic surfactants in the present foam concentrate. The anionic surfactant may suitably be a sodium, potassium and/or ammonium salt.

The aqueous fire-fighting foam concentrates may include a zwitterionic surfactant. The zwitterionic surfactant typically includes one or more of an alkylamidoalkyl betaine surfactant, an alkyl betaine surfactant, an alkyl sulfobetaine surfactant and an alkylamidoalkylene hydroxysultaine surfactant, such as an alkylamidopropyl hydroxysultaine surfactant. For example, the foam concentrate may include a zwitterionic surfactant, which comprises one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkyl betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In some embodiments, the zwitterionic surfactant includes a $C_{8-14}$-alkylamidopropyl hydroxysultaine, such as a cocamidopropyl hydroxysultaine. In some embodiments, the zwitterionic surfactant includes laurylamidopropyl hydroxysultaine and/or myristylamidopropyl hydroxysultaine. In embodiments that include the zwitterionic surfactant, the aqueous firefighting foam concentrate may include about 1 to 15 wt. % and often about 1 to 10 wt. % of the zwitterionic surfactant. In certain embodiments, the aqueous firefighting foam concentrate may include about 1 to 6 wt. % or about 2 to 5 wt. % of the zwitterionic surfactant.

The aqueous fire-fighting foam concentrate may optionally include a nonionic surfactant. In some embodiments, the concentrates and/or compositions are free of nonionic surfactants. The nonionic surfactant, when present, may include an alkylpolyglycoside surfactant. Suitable examples of the alkylpolyglycoside include a $C_{8-16}$-alkylpolyglycoside having an average degree of polymerization of about 1.0-2.0, or about 1.0-1.5. The alkylpolyglycoside surfactant may suitably include a $C_{8-12}$-alkylpolyglycoside, such as a $C_{8-12}$-alkylpolyglucoside. Suitable examples of the alkylpolyglycoside include a $C_{9-11}$-alkylpolyglucoside, such as a $C_{9-11}$-alkylpolyglucoside having an average degree of polymerization of about 1.4-1.7. Illustrative $C_{9-11}$-alkylpolyglucosides include nonyl, decyl and/or an undecyl polyglucoside. Other illustrative examples of the alkylpolyglycoside include a $C_{8-10}$-alkylpolyglucoside, which may have an average degree of polymerization of about 1.0-1.5. In embodiments that include the nonionic surfactant, the aqueous firefighting foam composition may suitably include about 2 to 20 wt. % of the nonionic surfactant. The aqueous firefighting foam composition may include about 3 to 15 wt. % and, in some instances about 5 to 12 wt. % of a nonionic surfactant, such as a $C_{8-12}$-alkylpolyglycoside. In some embodiments, the composition may contain about 7 to 10 wt. % of the nonionic surfactant.

The aqueous fire-fighting foam concentrates may include a water-miscible solvent, which may suitably include one or more of a glycol, a glycol ether, glycerol and a water-soluble polyethylene glycol. Examples of suitable organic solvents include diethylene glycol n-butyl ether, dipropylene glycol n-propyl ether, hexylene glycol, ethylene glycol, propylene glycol, diethylene glycol, dipropylene glycol, tripropylene glycol, dipropylene glycol monobutyl ether, dipropylene glycol monomethyl ether, diethylene glycol monobutyl ether ("butyl carbitol"), ethylene glycol monobutyl ether, tripropylene glycol monomethyl ether, dipropylene glycol monoethyl ether, glycerol, and mixtures of two or more thereof. Illustrative organic solvents include mixtures of an alkylene glycol and a glycol ether, such as a glycol butyl ether. In some embodiments, the organic solvent includes an alkylene glycol ether, such as ethylene glycol monoalkyl ether, propylene glycol monoalkyl ether, dipropylene glycol monoalkyl ether (e.g., and/or diethylene glycol monoalkyl ether (e.g., butyl carbitol). In some embodiments, the organic solvent includes an alkylene glycol, such as ethylene glycol, propylene glycol, dipropylene glycol and/or diethylene glycol. Illustrative organic solvents include a mixture of butyl carbitol and a glycol ether, such as ethylene glycol and/or propylene glycol. For example, the organic solvent can include ethylene glycol and butyl carbitol. In another suitable example, the organic solvent includes propylene glycol and butyl carbitol.

The foam concentrate may include about 1 to 50 wt. %, about 5 to 25 wt. %, about 10 to 23 wt. %, or about 15 to 20 wt. % of the organic solvent. In many embodiments, the aqueous firefighting foam concentrate includes an organic solvent including one or more of an alkylene glycol, glycerol and a glycol ether. The alkylene glycol typically includes propylene glycol and/or ethylene glycol. The glycol ether typically includes ethylene glycol monoalkyl ether, diethylene glycol monoalkyl ether, dipropylene glycol monoalkyl ether, triethylene glycol monoalkyl ether and 1-butoxyethoxy-2-propanol. In some embodiments, the organic solvent may be a mixture of alkylene glycol and glycol ether. In some embodiments, the organic solvent may be a mixture of propylene glycol and alkyl carbitol. In such embodiments, the organic solvent may include the alkylene glycol and alkyl carbitol in a weight ratio of about 0.05:1 to 20:1 or about 0.1:1 to 10:1 or about 0.125:1 to 8:1. In some embodiments, the organic solvent may be a mixture of propylene glycol and butyl carbitol. In some embodiments, the organic solvent may include about 10 to 20 wt. % and often about 12 to 18 wt. % alkylene glycol, such as propylene glycol, together with about 1 to 5 wt. % and often about 1 to 3 wt. % of a glycol ether, such as butyl carbitol. In some embodiments, the foam concentrate may include about 15 wt. % propylene glycol and about 2 wt. % butyl carbitol.

The aqueous firefighting foam composition includes a thickener, such as a polysaccharide thickener. The polysaccharide thickener may include a polysaccharide that is soluble in the aqueous firefighting foam concentrate and a second polysaccharide that is less soluble or insoluble in the aqueous firefighting foam concentrate. In some embodiments, the second polysaccharide may be insoluble (and dispersed) in the aqueous firefighting concentrate but may be soluble in water alone or in solutions where the concentrate has been diluted with a much larger volume of water. In other embodiments, the concentrate may only include one or more polysaccharides that are completely soluble in the concentrate. The foam concentrate typically includes about 0.1 to 5 wt. %, about 1 to 4 wt. %, and, often, about 2 to 3 wt. % of the polysaccharide thickener. In some embodiments, the foam concentrate includes about 2 to 3 wt. % of a mixture of polysaccharide thickeners, e.g., a mixture of xanthan gum and one or more of welan gum, succinoglycan and diutan gum.

Examples of suitable polysaccharide thickeners, which may be used in the present foam concentrates, include agar, sodium alginate, carrageenan, gum arabic, gum guaiacum, neem gum, *Pistacia lentiscus*, gum chatti, caranna, galactomannan, gum tragacanth, karaya gum, guar gum, welan gum, rhamsam gum, succinoglycan locust bean gum, beta-glucan, cellulose, methylcellulose, chicle gum, kino gum, dammar gum, glucomannan, mastic gum, spruce gum, tara gum, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and a mixture of two or more thereof.

In some embodiments, the polysaccharide thickener may include one or more of xanthan gum, diutan gum, rhamsan gum, welan, gellan gum, guar gum, succinoglycan, konjac gum, tara gum, and methylcellulose. In some embodiments, it may advantageous to include a mixture of xanthan gum and one or more of diutan gum, rhamsan gum, welan, gellan Gum, guar gum, succinoglycan, konjac gum, tarn gum, and methylcellulose. In other embodiments, the foam concentrate may include a mixture of xanthan gum and one or more of diutan gum, rhamsan gum, welan gum and gellan gum as the polysaccharide thickener. In other embodiments, the foam concentrate may advantageously include one or more of xanthan gum, succinoglycan, welan gum, diutan gum and/or rhamsan gum. In other embodiments, the foam concentrate may advantageously include xanthan gum and succinoglycan. In other embodiments, the foam concentrate may advantageously include xanthan gum and diutan gum. In other embodiments, the foam concentrate may advantageously include xanthan gum and rhamsan gum. In other embodiments, the foam concentrate may advantageously include xanthan gum and welan gum. In other embodiments, the foam concentrate may advantageously include welan gum.

Polysaccharide thickeners, which include a combination of xanthan gum and diutan gum, may be particularly suitable for use in the present foam concentrates. For examples, the foam concentrate may include about 0.2 to 3 wt. %, about 0.3 to 2 wt. %, and even, about 0.5 to 1.5 wt. % xanthan gum. Such foam concentrates may also include about 0.1 to 2 wt. %, about 0.5 to 2 wt. % or even, about 0.2 to 1.5 wt. % diutan gum.

In other instances, polysaccharide thickeners, which include a combination of xanthan gum and succinoglycan, may be particularly suitable for use in the present foam concentrates. In other examples, the foam concentrate may include xanthan gum and about 0.5 to 5 wt. %, about 0.5 to 4 wt. % or even, about 1 to 3 wt. % succinoglycan.

In other instances, polysaccharide thickeners, which include a combination of xanthan gum and welan gum, may be particularly suitable for use in the present foam concentrates. In other examples, the foam concentrate may include xanthan gum and about 0.5 to 5 wt. %, about 0.5 to 4 wt. % or even, about 1 to 3 wt. % welan gum.

As discussed above, the aqueous firefighting foam concentrate includes water. In some embodiments, the water may be water from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 30 wt. % water, often at least about 40 wt. % water, or at least about 50 wt. % water. In some embodiments, the aqueous firefighting foam concentrate includes greater than about 60 wt. % water. In some embodiments, the aqueous firefighting foam composition may be produced using a source of water that has a total concentration of fluorine atoms on a weight percentage basis of no more than about 70 parts per trillion (ppt) F.

The aqueous firefighting foam compositions of the present disclosure may be substantially free of any fluorinated compounds. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. The aqueous firefighting foam compositions of the present disclosure are substantially free of fluorine. As used herein, the phrase "substantially free of fluorine" means that the composition has a total concentration of fluorine atoms on a weight percentage basis of no more than about 70 parts per trillion (ppt) F. The aqueous firefighting foam compositions of the present disclosure may include substantially less than 70 ppt F.

In some embodiments, the aqueous firefighting foam composition includes one or more chelators or sequestering buffers. Illustrative and non-limiting chelators and sequestering buffers include agents that sequester and chelate metal ions, including polyamino-polycarboxylic acids, ethylenediaminetetraacetic acid, citric acid, tartaric acid, nitrilotriacetic acid, hydroxyethylethylenediaminetriacetic acid and salts thereof. Illustrative buffers include Sorensen's phosphate or McIlvaine's citrate buffers.

In some embodiments, the aqueous firefighting foam composition includes one or more corrosion inhibitors. Illustrative and non-limiting corrosion inhibitors includes ortho-phenylphenol, tolyltriazole, and phosphate ester acids. In some embodiments, the corrosion inhibitor is tolyltriazole.

In some embodiments, the aqueous firefighting foam concentrate may also include a metallic salt, typically a metallic salt which includes a multi-valent cation. For example, suitable salts may include a cation selected from the group consisting of aluminum, calcium, copper, iron, magnesium, potassium, and calcium cations. The counterания may suitably be a sulfate and/or phosphate anion. In one embodiment, the metallic salt may include magnesium sulfate.

In some embodiments, the aqueous firefighting foam concentrate may include a reducing agent. Accordingly, an aqueous fire-fighting foam concentrate may include a surfactant component comprising an anionic surfactant, a zwitterionic surfactant, a nonionic surfactant, or a mixture of any two or more thereof; and a reducing agent. The aqueous firefighting foam may further include an aliphatic alcohol-based component comprising at least two compounds selected from $C_8$-$C_{14}$-aliphatic alcohols and ethoxylates of $C_{10}$-$C_{14}$-aliphatic alcohols having an average of no more than about 6 ethylene oxide units; and at least about 30 wt. % water.

The reducing agent may be selected such that it is more readily oxidized compared to other components of the foam. For example, the reducing agent may be oxidized more readily than the sugar component or polysaccharide components. Illustrative reducing agents include, but are not limited to, sodium sulfite, sodium bisulfite, sodium metabisulfite, or a mixture of any two or more thereof.

In some embodiments, the aqueous firefighting foam concentrate may include a microfibrous cellulose. The microfibrous cellulose may be prepared by microbial fermentation or by mechanically disrupting/altering cereal, wood, or cotton-based cellulose fibers. When microfibrous cellulose prepared by microbial fermentation ("fermentation derived cellulose" or "FDC"), e.g., microfibrous cellulose prepared by bacterial fermentation ("bacterially-derived microfibrous cellulose") is utilized, the elimination of cellular debris may allow the production of transparent solutions at typical use levels. Microfibrous cellulose may function in viscous aqueous systems because it is dispersed rather than solubilized, thereby providing suspension properties in formulations that might otherwise display hazing and/or precipitation often seen using alternative solubilized polymer suspension agents.

A number of commercially available blends of microfibrous cellulose (MFC) with co-agents, which are suitable for use in the present concentrates, have been reported. For example, there have been reports of such materials that may contain either a mixture of microfibrous cellulose, xanthan gum, and carboxymethyl cellulose (CMC) in a ratio of 6:3:1, or a mixture of microfibrous cellulose, guar gum, and CMC in a ratio of 3:1:1. These blends allow the microfibrous cellulose to be prepared as a dry product that can be "activated" with high shear mixing into water or other water-based solutions. "Activation" occurs when these microfibrous cellulose blends are added to water and the polysaccharide co-agents become hydrated. After the hydration of the co-agents, high shear is generally needed to effectively disperse the microfibrous cellulose fibers to produce a three-dimensional functional network.

Illustrative microfibrous cellulose that may be suitable for use in the present concentrates include those sold under the tradename CELLULON™ Fermentation-Derived Cellulose (FDC). CELLULON™ FDC is marketed as an eco-friendly alternative derived from a microbial fermentation process. This may be sold in a liquid form (CELLULON™ Cellulose Liquid, available from CP Kelco). This pre-activated FDC solution offers functionality in high surfactant systems where other hydrocolloids may degrade over time. Alternatively, CELLULON™ FDC is available in a dry powder form, which requires activation via hydration with water and high shear mixing of the aqueous blend. One of products sold under the CELLULON™ cellulose tradename is a mixture containing fermentation-derived cellulose together with maltodextrin and sodium carboxymethyl cellulose (NaCMC) co-agents. In some instances, such a blend may include about 5 to 50 wt. %, or about 10 to 30 wt. % fermentation-derived cellulose together with a suitable co-agent(s).

As used herein, the term "fermentation-derived cellulose" (FDC) refers to any microfibrous cellulose produced by a microbial fermentation process (as opposed to materials produced by mechanically disrupting/altering cellulose fibers). CELLULON™ Fermentation-Derived Cellulose products are examples of suitable FDC material that may be used in the present firefighting foam concentrates.

The cellulose fibers of an activated FDC material may have a very fine diameter and, once activated, exist as a three-dimensional, highly reticulated net-like structure that gives a very high surface area-to-weight ratio. This three-dimensional, net-like structure can allow the FDC to create a true yield value at low concentrations in a formulation, even those with little or no water, and so provide a mechanism for reliable structuring of liquids and stabilization of components with minimal or no impact on a finished product's viscosity and dispersability.

The microfibrous cellulose included in the present compositions may suitably include microfibrous cellulose produced by mechanically disrupting/altering cellulose fibers, e.g., cereal, wood, and/or cotton-based cellulose fibers may be referred to as microfibrillated cellulose (MFC). Microfibrillated cellulose can be obtained through a fibrillation process of cellulose fibers. In such a process, the mechanical shearing can strip away the outer layer of the cellulose fibers, exposing the fibril bundles. The macroscopic fibers are typically mechanically sheared until the fibrils are released, resulting in separation of the cellulose fibers into a three dimensional network of microfibrils with a very large surface area. The exposed fibrils are much smaller in diameter compared to the original fibers, and can form a network or a web-like structure.

One suitable example of microfibrillated cellulose is Exilva™ microfibrillated cellulose (available from Borregaard, Sarpsborg, Norway). Exilva™ microfibrillated cellulose is a pre-activated product, available as a 2% suspension or a 10% paste, that is produced from mechanically disrupting cellulose sourced from Norway spruce. Exilva™ microfibrillated cellulose is reported to be an insoluble microfibrillated cellulose consisting of an entanglement of the cellulose fibers, which has the ability to interact both physically through its extreme surface area and chemically through hydrogen bonding. Other commercial sources of microfibrous cellulose include Celova® microfibrillated cellulose (available from Weidmann Electrical Technology AG (Rapperswil, Switzerland) and Curran® microfibrillated cellulose (available from CelluComp, Fife, Scotland). Curran® microfibrillated cellulose is produced from extraction of nanocellulose fibers from waste streams of root vegetables, primarily carrots and sugar beet pulp.

Another suitable example of a source of microfibrillated cellulose for use in the present compositions is microfibrillated cellulose-mineral composite commercially available from FiberLean® Technologies (Par Moor Centre, United Kingdom). The FiberLean® MFC-composite is reportedly produced by fibrillating the cellulose fibers in the presence of one of a number of different minerals, such as calcium carbonate, clay (e.g., kaolin or bentonite), alumina, zirconia, graphite, silicate or talc, to obtain a nano-fibrillar cellulose suspension.

In many embodiments, the present concentrates may include about 0.1 to 5 wt. %, about 0.5 to 5 wt. % about 1 to 4 wt. % or, in some instances, about 0.5 to 3 wt. % of a suspension agent, which includes microfibrous cellulose. The microfibrous cellulose may include a fermentation-derived cellulose, such as a microfibrous cellulose derived from a microbial fermentation process. In some embodiments, the microfibrous cellulose includes cellulose derived from a bacterial fermentation process, e.g., from fermentation of a *Komagataeibacter xylinus* strain or a *Acetobacter xylinum* strain. Fermentation-derived cellulose (FDC) produced by such a method may have an average fiber diameter of about 0.1-0.2 μm. This very small fiber size and diameter means that a given weight of FDC can have up to 200 times more surface area than other forms of cellulose.

In many embodiments of the present concentrates, a suspension agent includes microfibrous cellulose together with one or more co-agents. The co-agent(s) may suitable include a water-soluble oligosaccharide and/or water-soluble polysaccharide. The suspension agent may suitable include about 5 to 75 wt. % and, in some instances, about 5 to 50 wt. % or about 10 to 30 wt. % of the microfibrous cellulose. The suspension agent may typically include about 25 to 95 wt. % and, in some instances, about 50 to 90 wt. % or about 70 to 90 wt. % of a co-agent. The co-agent may include a water-soluble oligosaccharide, such as maltodextrin. In other instances, the suspension agent may include a water-soluble polysaccharide co-agent, such as one or more of carboxymethyl cellulose (CMC), a carboxymethyl cellulose salt, xanthan gum and guar gum. In one suitable embodiment, the suspension agent includes fermentation-derived cellulose together with a co-agent including sodium carboxymethyl cellulose and maltodextrin.

The microfibrous cellulose employed in the present concentrates may suitably have an average fiber diameter of no more than about 10 μm, or no more than about 1 μm, and in some instances from about 50 to 300 nm (0.05-0.3 μm). The microfibrous cellulose may be derived from microbial fermentation. Prior to inclusion in the present concentrates, such microbial fermentation derived cellulose may be activated by combining a powdered microfibrous cellulose and any optional co-agent with water and then mixing with high shear.

In some embodiments, the present concentrates may include about 0.1 to 5 wt. %, about 0.2 to 5 wt. % about 0.5 to 4 wt. %, or, in some instances, about 0.5 to 3 wt. % microfibrous cellulose. As described herein, the microfibrous cellulose may include fermentation derived cellulose (FDC), microfibrillated cellulose, or a combination thereof. In many instances, the microfibrous cellulose may be formulated together with a co-agent, such as a water-soluble oligosaccharide and/or water-soluble polysaccharide.

In some embodiments, the aqueous firefighting foam concentrate may also include a preservative, such as one or more antimicrobial compounds and/or biocidal compounds. These components are included to prevent the biological decomposition of natural product based polymers that may be incorporated as polymeric film formers (e.g., a polysaccharide gum). Examples of suitable antimicrobial/biocidal compounds include Kathon CG/ICP (Rohm & Haas Company), Givgard G-4 40 (Givaudan, Inc.), Dowicil 75 and Dowacide A (Dow Chemical Company).

Tables A-L below provide illustrations of various suitable formulations of the present firefighting foam concentrates. The Concentrates are designed to be combined with a diluent, aerated, and administered to as a firefighting foam fight and/or suppress a fire.

TABLE A

Illustrative Concentrate Formulation

| Ingredient (wt. %) | Base Formula |
|---|---|
| Biocide | 0-1.0 |
| Corrosion inhibitor | 0-0.1 |
| Alcohol-based component | 0.5-5 |
| Hydrocarbon anionic surfactant | 5-15 |
| Alkyl polyglucoside nonionic surfactant | 0-12 |
| Polysaccharide gum | 1-4 |

TABLE A-continued

| Illustrative Concentrate Formulation | |
|---|---|
| Ingredient (wt. %) | Base Formula |
| Glycol/glycol ether | 10-25 |
| Water | balance |

TABLE B

| Illustrative Concentrate Formulation | |
|---|---|
| Ingredient (wt. %) | Base Formula |
| Biocide | 0-1.0 |
| Corrosion inhibitor | 0-0.1 |
| Alcohol-based component | 0.3-5 |
| Alkyl sulfate anionic surfactant | 5-15 |
| Alkyl polyglycoside nonionic surfactant | 0-15 |
| Xanthan gum and/or diutan gum | 1-4 |
| 1,2-Propylene glycol | 10-20 |
| Butyl carbitol | 0.5-5 |
| Water | balance |

TABLE C

| Illustrative Concentrate Formulation | |
|---|---|
| Ingredient (wt. %) | Base Formula |
| Biocide | 0-1.0 |
| Corrosion inhibitor | 0-0.1 |
| Alcohol-based component | 0.3-3 |
| $C_{8-12}$-alkyl sulfate anionic surfactant | 5-15 |
| $C_{8-10}$-alkyl polyglucoside nonionic surfactant | 7-10 |
| Xanthan gum and/or diutan gum | 2-3 |
| 1,2-Propylene glycol | 12-18 |
| Butyl carbitol | 1-4 |
| Water | balance |

TABLE D

| Illustrative Concentrate Formulation | |
|---|---|
| Ingredient (wt. %) | Base Formula |
| Biocide | 0-1.0 |
| Corrosion inhibitor | 0-0.1 |
| Alcohol-based component | 0.3-3 |
| $C_{8-12}$-alkyl sulfate anionic surfactant | 5-15 |
| $C_{8-10}$-alkyl polyglucoside nonionic surfactant | 7-10 |
| Xanthan gum and/or succinoglycan | 1-4 |
| 1,2-Propylene glycol | 12-18 |
| Butyl carbitol | 1-4 |
| Microfibrous cellulose | 0.1-5 |
| Water | balance |

TABLE E

| Illustrative Concentrate Formulation | |
|---|---|
| Ingredient | Amount (wt. %) |
| Biocide | 0-1.0 |
| Corrosion inhibitor | 0-0.2 |
| Alkyl polyglycoside nonionic surfactant | 0-20 |
| Zwitterionic surfactant | 1-10 |
| Hydrocarbon anionic surfactant | 1-20 |
| Aliphatic alcohol-based component | 0.2-5 |
| Water-miscible organic solvent | 1-30 |
| Polysaccharide gum | 0.1-5 |
| Microfibrous cellulose | 0.1-5 |
| Water | balance |

TABLE F

| Illustrative Concentrate Formulation | |
|---|---|
| Ingredient | Amount (wt. %) |
| Biocide | 0-1.0 |
| Corrosion inhibitor | 0-0.1 |
| Alkyl polyglycoside nonionic surfactant | 0-20 |
| Hydrocarbon anionic surfactant | 1-20 |
| Aliphatic alcohol-based component | 0.2-5 |
| Water-miscible organic solvent | 1-30 |
| Polysaccharide gum | 0.1-5 |
| Microfibrous cellulose | 0.1-5 |
| Water | balance |

TABLE G

| Illustrative Concentrate Formulation | |
|---|---|
| Ingredient | Amount (wt. %) |
| Biocide | 0-1.0 |
| Corrosion inhibitor | 0-0.1 |
| Aliphatic Zwitterionic surfactant | 1-10 |
| Aliphatic anionic surfactant | 2-20 |
| Aliphatic alcohol-based component | 0.2-5 |
| Water-miscible organic solvent | 1-30 |
| Polysaccharide gum | 0.1-5 |
| Water | balance |

TABLE H

| Illustrative Concentrate Formulation | |
|---|---|
| Ingredient | Amount (wt. %) |
| Biocide | 0-1.0 |
| Corrosion inhibitor | 0-0.1 |
| Aliphatic hydroxysultaine surfactant | 1-10 |
| Aliphatic sulfate anionic surfactant | 2-20 |
| Aliphatic alcohol-based component | 0.2-5 |
| Water-miscible organic solvent | 1-10 |
| Xanthan gum and/or welan gum | 1-5 |
| Water | balance |

TABLE J

| Illustrative Concentrate Formulation | |
|---|---|
| Ingredient | Amount (wt. %) |
| Biocide | 0-1.0 |
| Corrosion inhibitor | 0-0.1 |
| Aliphatic hydroxysultaine surfactant | 1-10 |
| Aliphatic sulfate anionic surfactant | 2-20 |
| Aliphatic alcohol-based component | 0.2-5 |
| Water-miscible organic solvent | 1-10 |
| Xanthan gum and/or succinoglycan | 1-5 |
| Microfibrous cellulose | 0.1-5 |
| Water | balance |

TABLE K

| Illustrative Concentrate Formulation | |
|---|---|
| Ingredient | Amount (wt. %) |
| Biocide | 0-1.0 |
| Corrosion inhibitor | 0-0.1 |
| Aliphatic hydroxysultaine surfactant | 1-10 |
| Aliphatic sulfate anionic surfactant | 2-20 |
| Aliphatic alcohol-based component | 0.2-5 |
| Water-miscible organic solvent | 1-10 |
| Xanthan gum and/or succinoglycan | 1-5 |
| Reducing Agent | 0.1-5 |
| Microfibrous cellulose | 0.1-5 |
| Water | balance |

TABLE L

| Illustrative Concentrate Formulation | |
|---|---|
| Ingredient | Amount (wt. %) |
| Biocide | 0-1.0 |
| Corrosion inhibitor | 0-0.1 |
| Aliphatic hydroxysultaine surfactant | 1-10 |
| Aliphatic sulfate anionic surfactant | 2-20 |
| Aliphatic alcohol-based component | 0.2-5 |
| Water-miscible organic solvent | 1-10 |
| Xanthan gum and/or succinoglycan | 1-5 |
| Water | balance |

The present aqueous firefighting compositions may advantageously be substantially free of any fluorinated compounds. As used herein, the "phrase substantially free of fluorinated compounds" means that the aqueous firefighting composition includes no more than 0.1 wt. % fluorinated compounds. In some embodiments, the aqueous firefighting composition includes no more than 0.01 wt. % and, in some instances, no more than about 0.005 wt. % fluorinated compounds. The aqueous firefighting compositions of the present disclosure may be substantially free of fluorine in any form. As used herein, the phrase "substantially free of fluorine" means that the aqueous firefighting composition has a total concentration of fluorine atoms on a weight percentage basis of no more than about 70 ppt F.

The present invention, thus generally described, will be understood more readily by reference to the following examples, which are provided by way of illustration and are not intended to be limiting of the present invention.

EXAMPLES

The following examples more specifically illustrate formulations for preparing aqueous firefighting compositions according to various embodiments described herein. These examples should in no way be construed as limiting the scope of the present technology.

Example A. Tables 1 and 2 below show the compositions of a number of illustrative formulations of the present aqueous firefighting foam concentrate. The amounts shown in these tables represent the weight percentage of the particular component based on the total weight of the composition. Table 1 shows the composition of a Base Formulation A used to prepare a number of different examples of the present concentrate. This base formulation includes a biocide; a corrosion inhibitor, such as tolyltriazole; an aliphatic alcohol-based component; anionic surfactant(s), such as the triethanolamine salt of lauryl sulfate (TEA-lauryl sulfate) and sodium octyl sulfate; a nonionic surfactant, such as $C_8$-$C_{10}$-alkyl polyglucoside; a polysaccharide gum, such as xanthan and/or diutan gum; a water-miscible organic solvent, such as 1,2-propylene glycol and/or butyl carbitol; and water. The specific aliphatic alcohol-based component is detailed in Table 2.

TABLE 1

| Base Formulation A | |
|---|---|
| Ingredient (wt. %) | Base Formula A |
| Biocide | 0.02 |
| Tolyltriazole | 0.04 |
| Alcohol-based Component | 0.9-1.8 |
| TEA-lauryl sulfate | 4.8 |
| Na octyl sulfate | 3.2 |
| $C_8$-$C_{10}$-alkyl polyglucoside | 8.5 |
| Xanthan gum | 0.8 |
| Diutan gum | 1.8 |
| 1,2-Propylene glycol | 15 |
| Butyl carbitol | 2 |
| TEA | Opt. |
| Magnesium sulfate | Opt. |
| Fermentation Derived Cellulose | Opt. |
| Water | balance |

TABLE 2

| Illustrative Examples | | | |
|---|---|---|---|
| Example | Alcohol-based Component | Alcohol-based Component (Wt. %) | Krafft Point (° C. ) |
| A1 | $C_{12}$-$C_{14}$ fatty alcohol | 1.8 | 13 |
| A2 | $C_{12}$-$C_{14}$ fatty alcohol | 0.9 | 10 |
| A3 | Lauryl alcohol | 1.8 | 14 |
| A4 | Lauryl alcohol | 0.9 | 12 |
| A5 | Myristyl alcohol | 1.8 | 18 |
| A6 | Octyl alcohol/lauryl alcohol | 0.9/0.9 | <−8 |
| A7 | Ethox. (1 EO) lauryl alcohol | 1.8 | <−8 |
| A8 | Lauryl alcohol/Ethox. (1 EO) lauryl alcohol | 0.9/0.9 | <−8 |
| A9 | Ethox. (2 EO) lauryl alcohol | 1.8 | <−8 |
| A10 | Lauryl alcohol/Ethox. (2 EO) lauryl alcohol | 0.9/0.9 | <−8 |
| A11 | Ethox. (3 EO) lauryl alcohol | 1.8 | <−8 |
| A12 | Lauryl alcohol/Ethox. (3 EO) lauryl alcohol | 0.9/0.9 | <−8 |
| A13 | Octyl alcohol/myristyl alcohol | 0.9/0.9 | 15 |
| A14 | Decyl alcohol/lauryl alcohol | 0.9/0.9 | −4 |
| A15 | Decyl alcohol/myristyl alcohol | 0.9/0.9 | 15 |

The illustrative aqueous fire-fighting foam formulations shown in Tables 1 and 2 typically have a Krafft point less than 15° C. and, in some embodiments, may have a Krafft point less than 0° C., or further, may have a Krafft point less than −8° C. Determinations of the Krafft Point of the formulations were made by placing a 50 mL sample of the concentrate in a temperature bath at a temperature below the anticipated Krafft Point. Then the temperature of the bath was raised at </=1° C./hr until the all the surfactants were resolubilized. The lowest observed temperature where all of the surfactants are soluble is recorded as the Krafft Point.

Example B. Table 3 below shows the compositions of a number of additional illustrative formulations of the present aqueous firefighting foam concentrate, which may be produced using the base formula A shown in Table 1.

TABLE 3

| Illustrative Examples | | |
|---|---|---|
| Example | Alcohol-based Component | Wt. % Alcohol-based Component |
| B1 | Octyl alcohol/myristyl alcohol | 0.75/0.75 |
| B2 | Decyl alcohol/lauryl alcohol | 0.5/0.5 |
| B3 | Decyl alcohol/lauryl alcohol | 0.75/0.75 |
| B4 | Decyl alcohol | 0.9 |
| B5 | Octyl alcohol/lauryl alcohol | 0.45/0.45 |
| B6 | Octyl alcohol/lauryl alcohol | 0.75/0.75 |
| B7 | Octyl alcohol/decyl alcohol | 0.45/0.45 |
| B8 | Octyl alcohol/decyl alcohol | 0.9/0.9 |

Example C. Tables 4 and 5 below show the compositions of a number of illustrative formulations of the present aqueous firefighting foam concentrate. The amounts shown in these tables represent the weight percentage of the particular component based on the total weight of the composition. Table 4 shows the composition of a Base Formulation C used to prepare a number of different examples of the present concentrate. This base formulation includes a biocide; a corrosion inhibitor, such as tolyltriazole; an aliphatic alcohol-based component; anionic surfactant(s), such as the triethanolamine salt of lauryl sulfate (TEA-lauryl sulfate), decyl sulfate and sodium octyl sulfate; a zwitterionic surfactant, such as cocamidopropyl hydroxysultaine; a polysaccharide gum, such as xanthan gum, succinoglycan and/or diutan gum; a water-miscible organic solvent, such as butyl carbitol; and water. This formulation is free of nonionic surfactant. The specific aliphatic alcohol-based compo nent(s) and polysaccharide thickener(s) is detailed in Table 5.

TABLE 4

| Base Formulation C | |
|---|---|
| Ingredient (wt. %) | Base Formula C |
| Biocide | 0.02 |
| Tolyltriazole | 0.05 |
| Alcohol-based Component | 0.3-1.0 |
| TEA-lauryl sulfate | 3-4 |
| Na octyl sulfate | 3-4 |
| Decyl sulfate | 0.5-1.0 |
| Cocamidopropyl hydroxysultaine | 2-6 |
| Polysaccharide | 1-4 |
| Butyl carbitol | 5 |
| Fructose/glucose | 12-15 |
| TEA | 0.1 |
| Magnesium sulfate | 1.0 |
| Water | balance |

TABLE 5

| Illustrative Examples | | | |
|---|---|---|---|
| Example | Alcohol-based Component | Wt. % Alcohol-based Component(s) | Wt. % Polysaccharide Component |
| C1 | Lauryl alcohol<br>Xanthan gum/succinoglycan | 1.4 | 0.5/2.0 |
| C2 | Lauryl alcohol<br>Xanthan gum/diutan gum | 1.0 | 0.5/1.5 |
| C3 | Octyl alcohol/lauryl alcohol<br>Xanthan gum/succinoglycan | 0.75/0.75 | 0.7/2.5 |
| C4 | Decyl alcohol/lauryl alcohol<br>Xanthan gum/succinoglycan | 0.5/0.5 | 0.5/1.5 |

TABLE 5-continued

| Illustrative Examples | | | |
|---|---|---|---|
| Example | Alcohol-based Component | Wt. % Alcohol-based Component(s) | Wt. % Polysaccharide Component |
| C5 | Octyl alcohol/lauryl alcohol<br>Xanthan gum/succinoglycan | 0.25/0.25 | 0.5/2.0 |
| C6 | Octyl alcohol/lauryl alcohol<br>Xanthan gum/welan gum | 0.5/0.5 | 0.5/1.5 |
| C7 | Octyl alcohol/lauryl alcohol<br>Xanthan gum/welan gum | 0.5/0.5 | 0.5/2.0 |

Example D. Table 6 shows the composition of an illustrative formulations of the present aqueous firefighting foam concentrate. The amounts shown in these tables represent the weight percentage of the particular component based on the total weight of the composition. Table 6 shows the composition of a Base Formulation D used to prepare a number of different examples of the present concentrate. This base formulation includes a biocide; a corrosion inhibitor, such as tolyltriazole; an aliphatic alcohol-based component; anionic surfactant(s), such as the triethanolamine salt of lauryl sulfate (TEA-lauryl sulfate), decyl sulfate and sodium octyl sulfate; a zwitterionic surfactant, such as cocamidopropyl hydroxysultaine; a polysaccharide gum, such as xanthan gum, succinoglycan and/or diutan gum; a water-miscible organic solvent, such as butyl carbitol; a reducing agent such as sodium sulfite, sodium bisulfate, or sodium metabisulfite; and water.

TABLE 6

| Base Formulation C | |
|---|---|
| Ingredient (wt. %) | Base Formula C |
| Biocide | 0.02 |
| Tolyltriazole | 0.05 |
| Alcohol-based Component | 0.3-1.0 |
| TEA-lauryl sulfate | 3-4 |
| Na octyl sulfate | 3-4 |
| Decyl sulfate | 0.5-1.0 |
| Cocamidopropyl hydroxysultaine | 2-6 |
| Polysaccharide | 1-4 |
| Butyl carbitol | 5 |
| Fructose/glucose | 12-15 |
| TEA | 0.1 |
| Magnesium sulfate | 1.0 |
| Reducing Agent | 0.1-5 |
| Fermentation derived cellulose | 0.1-5 |
| Water | balance |

Method of Producing a Firefighting Foam. The firefighting foam concentrates described herein may be mixed with a diluent to form firefighting foam precursor solution, i.e., a use strength composition. The firefighting foam precursor solution may be aerated (e.g., using a nozzle) to produce a firefighting foam including the firefighting foam concentrate and the diluent. Typically, the concentrate is mixed into a flowing stream of the diluent, e.g., the concentrate is introduced through the use of an eductor into a stream of the diluent flowing through a hose or pipe. Illustrative diluents may include water, such as fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam precursor solution.

In some instances, it has been found that the order of addition of ingredients with appropriate agitation in producing the present concentrates may impact the actual firefighting performance as seen in the UL and EN fire tests. It may be suitable to begin by mixing all or a portion of a water-miscible solvent component with a substantial amount of water and subsequently preparing a solution or slurry of the polysaccharide thickener in the resulting aqueous solution prior to blending in the remaining components of the foam concentrate. It was found that first preparing an aqueous solution by combining and mixing water-miscible solvent with water may facilitate later dissolution and/or dispersal of biogums/biopolymers (e.g., xanthan gum). This can allow the gums to properly hydrate without encapsulating (clumping) upon the addition of the surfactant(s), other optional compounds and remaining amounts of water. Surfactants and other optional compounds can then be added and the resulting mixture may finally be diluted further with water to decrease the viscosity of the preparation, if desired.

Firefighting foams that were prepared not following this order of component addition may result in polysaccharide biogums that are encapsulated, but not fully hydrated, which can result in the production of foams that exhibit less than satisfactory for fire suppression performance. Thus, in some embodiments, the initial formation of an aqueous solution containing water-miscible solvent can be important in process order and can be used to dissolve/disperse polysaccharide thickener(s) into the foam concentrate before addition of any other ingredients, such as surfactant(s) and/or other compounds.

Method of Fighting a Fire. The firefighting foam compositions described herein may be used to fight a fire and/or to suppress flammable vapors by mixing the firefighting foam compositions with a diluent, aerating the resulting firefighting foam precursor solution to form a firefighting foam, and administering the firefighting foam to a fire or applying the firefighting foam to the surface of a volatile flammable liquid (e.g., gasoline or other flammable hydrocarbon or a flammable polar solvent).

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

In an illustrative embodiment, the aqueous firefighting foam concentrate includes a surfactant component, which includes one or more of an anionic surfactant, a zwitterionic surfactant, and optionally a nonionic surfactant; an aliphatic alcohol-based component, which comprises at least two compounds selected from $C_{8-14}$-aliphatic alcohols and ethoxylates of $C_{10-14}$-aliphatic alcohols having an average of no more than about 6 ethylene oxide units; and at least about 30 wt. % water. Some illustrative embodiments may include a polysaccharide thickener and a water-miscible organic solvent. In some embodiments, the concentrates and/or compositions are free of nonionic surfactants.

In another illustrative embodiment, the aqueous firefighting foam concentrate includes about 2-50 wt. % of the surfactant component; about 0.1-10 wt. % of the aliphatic alcohol-based component; and at least about 50 wt. % water; and further comprising about 1-30 wt. % of a water-miscible organic solvent. In some instances, the concentrate may also include about 0.1 to 5 wt. % of a polysaccharide thickener, such as a natural gum thickener.

In another illustrative embodiment, the aqueous firefighting foam concentrate includes a polysaccharide thickener; a surfactant component, which comprises one or more of an anionic surfactant, a zwitterionic surfactant, and optionally a nonionic surfactant; an aliphatic alcohol-based component, which comprises at least one ethoxylate of a $C_{10-14}$-aliphatic alcohol having an average of no more than about 6 ethylene oxide units; water-miscible organic solvent; and at least about 30 wt. % water. In some embodiments, the concentrates and/or compositions are free of nonionic surfactants.

In another illustrative embodiment, the aqueous firefighting foam concentrate includes about 0.1 to 5 wt. % of a polysaccharide thickener; about 5 to 50 wt. % of a surfactant component, which comprises two or more of an anionic surfactant, a zwitterionic surfactant, and optionally a nonionic surfactant; about 0.1 to 5 wt. % of an aliphatic alcohol-based component, which comprises at least two compounds selected from $C_{8-14}$-aliphatic alcohols and ethoxylates of $C_{10-14}$-aliphatic alcohols having an average of no more than about 6 ethylene oxide units; about 1 to 30 wt. % of water-miscible organic solvent; and at least about 50 wt. % water. In some embodiments, the concentrates and/or compositions are free of nonionic surfactants.

In another illustrative embodiment, the aqueous firefighting foam concentrate includes polysaccharide thickener, comprising xanthan gum and/or diutan gum; an alkyl sulfate anionic surfactant; an alkyl polyglycoside nonionic surfactant; an aliphatic alcohol-based component, which comprises at least two compounds selected from capryl alcohol, lauryl alcohol, a lauryl alcohol ethoxylate having an average of about 1 to 4 ethylene oxide units; water-miscible organic solvent, which comprises propylene glycol and butyl carbitol; and at least about 50 wt. % water.

In any of the preceding embodiments, the aliphatic alcohol-based component may optionally include at least two linear $C_{8-14}$-aliphatic alcohols.

In any of the preceding embodiments, the aliphatic alcohol-based component may optionally include capryl alcohol and lauryl alcohol in a weight ratio from 1:5 to 5:1, or a weight ratio from 1:2 to 2:1.

In any of the preceding embodiments, the aliphatic alcohol-based component may optionally include an ethoxylate of a linear $C_{12}$- or $C_{14}$-aliphatic alcohol having an average of no more than about 6, or no more than about 4 ethylene oxide units.

In any of the preceding embodiments, the aliphatic alcohol-based component may optionally include a lauryl alcohol ethoxylate having an average of no more than about 5 ethylene oxide units.

In any of the preceding embodiments, the aliphatic alcohol-based component may optionally include a myristyl alcohol ethoxylate having an average of no more than about 5 ethylene oxide units.

In some of the preceding embodiments, the aliphatic alcohol-based component may optionally include lauryl alcohol and a lauryl alcohol ethoxylate having an average of no more than about 5 ethylene oxide units.

In other embodiments, the concentrate includes about 0.1 to 5 wt. % of the polysaccharide thickener.

In another embodiment, the surfactant component contains an anionic surfactant including an alkyl sulfate salt, an alkyl ether sulfate salt, and/or an alkyl sulfonate salt.

In another embodiment, the surfactant component includes an anionic surfactant including one or more $C_{8-14}$-alkyl sulfate salts and/or $C_{8-14}$-alkyl ether sulfate salts.

In any of the preceding embodiments, the surfactant component may optionally include one or more octyl sulfate salt, decyl sulfate salt, lauryl sulfate salt, or a combination thereof.

In any of the preceding embodiments, the concentrate includes about 1 to 30 wt. %, about 2 to 20 wt. %, or about 5 to 15 wt. % of the anionic surfactant.

In any of the preceding embodiments, the surfactant component includes an alkyl polyglycoside nonionic surfactant, which may be an alkyl polyglucoside, e.g., a $C_{8-10}$-alkyl polyglucoside having an average degree of polymerization of no more than about 1.5.

In the preceding embodiments that include an organic solvent, the organic solvent may suitably be ethylene glycol, propylene glycol, and/or an alkyl carbitol. For example, the organic solvent may include a mixture propylene glycol and butyl carbitol. In some of these embodiments, the organic solvent may include diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, or a mixture of two or more thereof. Also in these embodiments, the concentrate is made up of about 1 to 30 wt. %, about 5 to 25 wt. % organic solvent, about 10 to 25 wt. %, or about 12-20 wt. % organic solvent.

In any of the preceding embodiments, the concentrate may also include biocide and/or a corrosion inhibitor.

In any of the preceding embodiments, the aliphatic alcohol-based component may include an ethoxylate of a linear $C_{10-14}$-aliphatic alcohol having no more than about 3 ethylene oxide units.

In any of the preceding embodiments, the concentrate may include about 0.1 to 5 wt. %, about 0.5 to 2 wt. %, or about 0.7 to 2 wt. % of the aliphatic alcohol-based component.

In the preceding embodiments including a polysaccharide thickener, the polysaccharide thickener may include one or more of agar, sodium alginate, carrageenan, gum arabic, gum guaiacum, neem gum, *Pistacia lentiscus*, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, gellan gum, xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate.

In other embodiments, the polysaccharide thickener includes one or more of xanthan gum, diutan gum, rhamsan gum, welan gum, gellan gum, guar gum, konjac gum, tara gum, and methylcellulose.

In other embodiments, the polysaccharide thickener may include one or more of xanthan gum, diutan gum and rhamsan gum.

In another embodiment, the concentrate includes: a) about 1 to 50 wt. % of the surfactant component; b) about 0.2 to 5 wt. % of the aliphatic alcohol-based component; c) about 1 to 30 wt. % organic solvent; d) about 0.1 to 5 wt. % polysaccharide thickener; and e) at least about 50 wt. % water; wherein the composition contains no more than 0.01 wt. % fluorinated surfactants.

In another embodiment, the concentrate includes: a) about 5 to 15 wt. % of the anionic surfactant; b) about 3 to 10 wt. % of an alkyl polyglycoside nonionic surfactant; c) about 0.2 to 5 wt. % of the aliphatic alcohol-based component; d) about 10 to 25 wt. % of a water-miscible organic solvent; e) about 0.1 to 5 wt. % of a polysaccharide thickener; and f) at least about 50 wt. % water; and the concentrate contains no more than 0.01 wt. % fluorinated surfactants.

In another embodiment, the concentrate includes: a) about 5 to 20 wt. % of a surfactant mixture of an octyl sulfate salt, a lauryl sulfate salt, and an alkyl polyglycoside surfactant; b) about 0.1 to 2 wt. % lauryl alcohol; c) about 0.1 to 2 wt. % ethoxylated lauryl alcohol; d) about 10 to 25 wt. % of a mixture of propylene glycol and butyl carbitol; e) about 0.5 to 3 wt. % diutan gum and/or xanthan gum; and f) at least about 50 wt. % water; and the concentrate contains no more than 0.01 wt. % fluorinated surfactants.

In another embodiment, the concentrate includes: about 1-4 wt. % polysaccharide thickener, which comprises xanthan gum and/or diutan gum; about 5-15 wt. % $C_{8-12}$-alkyl sulfate anionic surfactant; about 3-15 wt. % $C_{8-10}$-alkyl polyglycoside nonionic surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; about 10-20 wt. % propylene glycol; butyl carbitol; and at least about 50 wt. % water; wherein the concentrate contains no more than 0.01 wt. % fluorinated surfactants.

In another embodiment, the concentrate includes: about 1-4 wt. % polysaccharide thickener, which comprises xanthan gum and/or diutan gum; about 5-15 wt. % $C_{8-14}$-alkyl sulfate anionic surfactant; about 2-10 wt. % $C_{8-18}$-alkylamidopropyl hydroxysultaine surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; propylene glycol and butyl carbitol; and at least about 50 wt. % water; wherein the concentrate contains no more than 0.01 wt. % fluorinated surfactants.

In another embodiment, the concentrate includes: about 1-4 wt. % polysaccharide thickener, which comprises xanthan gum and/or welan gum; about 5-15 wt. % $C_{8-14}$-alkyl sulfate anionic surfactant; about 2-10 wt. % $C_{8-18}$-alkylamidopropyl hydroxysultaine surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; propylene glycol and butyl carbitol; and at least about 50 wt. % water; wherein the concentrate contains no more than 0.01 wt. % fluorinated surfactants.

In another embodiment, the concentrate includes: about 1-4 wt. % polysaccharide thickener, which comprises xanthan gum and/or succinoglycan; about 5-15 wt. % $C_{8-14}$-alkyl sulfate anionic surfactant; about 2-10 wt. % $C_{8-18}$-alkylamidopropyl hydroxysultaine surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; propylene glycol and butyl carbitol; and at least about 50 wt. % water; wherein the concentrate contains no more than 0.01 wt. % fluorinated surfactants.

Another illustrative embodiment provides an aqueous fire-fighting foam concentrate including a) a polysaccharide thickener, which includes xanthan gum and/or welan gum, b) an alkyl sulfate anionic surfactant; c) an alkyl polyglycoside nonionic surfactant; d) an aliphatic alcohol-based component, which includes at least two compounds selected from capryl alcohol, lauryl alcohol, a lauryl alcohol ethoxylate having an average of about 1 to 4 ethylene oxide units; e) water-miscible organic solvent, which comprises propylene glycol and butyl carbitol, and f) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound.

Another illustrative embodiment provides an aqueous fire-fighting foam concentrate including a) a polysaccharide thickener, which includes xanthan gum and/or succinoglycan, b) an alkyl sulfate anionic surfactant; c) an alkyl polyglycoside nonionic surfactant; d) an aliphatic alcohol-based component, which includes at least two compounds selected from capryl alcohol, lauryl alcohol, a lauryl alcohol ethoxylate having an average of about 1 to 4 ethylene oxide units; e) water-miscible organic solvent, which comprises propylene glycol and butyl carbitol, and f) at least about 50 wt. % water. The composition may be substantially free of any fluorinated compound, e.g., contain no more than 0.01 wt. % fluorinated surfactant(s) and, often, is completely free of any fluorinated surfactant or other fluorinated compound.

Para. 1. An aqueous fire-fighting foam concentrate comprising: a surfactant component comprising an anionic surfactant, a zwitterionic surfactant, a nonionic surfactant, or a mixture of any two or more thereof; an aliphatic alcohol-based component comprising at least two compounds selected from $C_8$-$C_{14}$-aliphatic alcohols and ethoxylates of $C_{10}$-$C_{14}$-aliphatic alcohols having an average of no more than about 6 ethylene oxide units; and at least about 30 wt. % water.

Para. 2. The aqueous fire-fighting foam concentrate of para. 1 comprising: about 2 to 50 wt. % of the surfactant component; about 0.1 to 10 wt. % of the aliphatic alcohol-based component; and at least about 50 wt. % water; and further comprising about 1 to 30 wt. % of a water-miscible organic solvent.

Para. 3. The aqueous fire-fighting foam concentrate of para. 1 further comprising a polysaccharide thickener and a water-miscible organic solvent.

Para. 4. An aqueous fire-fighting foam concentrate comprising: a polysaccharide thickener; a surfactant component comprising an anionic surfactant, a zwitterionic surfactant, a nonionic surfactant, or a mixture of any two or more thereof; an aliphatic alcohol-based component comprising at least one ethoxylate of a $C_{10}$-$C_{14}$-aliphatic alcohol having an average of no more than about 6 ethylene oxide units; a water-miscible organic solvent; and at least about 30 wt. % water.

Para. 5. An aqueous fire-fighting foam concentrate comprising: about 0.1 to 5 wt. % of a polysaccharide thickener; about 5 to 50 wt. % of a surfactant component comprising two or more of an anionic surfactant, a zwitterionic surfactant, and a nonionic surfactant; about 0.1 to 5 wt. % of an aliphatic alcohol-based component comprising at least two compounds selected from $C_8$-$C_{14}$-aliphatic alcohols and ethoxylates of $C_{10}$-$C_{14}$-aliphatic alcohols having an average of no more than about 6 ethylene oxide units; about 1 to 30 wt. % of a water-miscible organic solvent; and at least about 50 wt. % water.

Para. 6. An aqueous fire-fighting foam concentrate comprising: a polysaccharide thickener comprising xanthan gum, welan gum, succinoglycan, diutan gum, or a mixture of any two or more thereof; an alkyl sulfate anionic surfactant, an alkyl polyglycoside nonionic surfactant; an aliphatic alcohol-based component comprising at least two compounds selected from capryl alcohol, lauryl alcohol, or a lauryl alcohol ethoxylate having an average of about 1 to 4 ethylene oxide units; a water-miscible organic solvent comprising propylene glycol and butyl carbitol; and at least about 50 wt. % water.

Para. 7. The aqueous fire-fighting foam concentrate of any of paras. 1 to 6, wherein the aliphatic alcohol-based component comprises at least two linear $C_8$-$C_{14}$-aliphatic alcohols.

Para. 8. The aqueous fire-fighting foam concentrate of any of paras. 1 to 7 wherein the aliphatic alcohol-based component comprises capryl alcohol and lauryl alcohol in a weight ratio of from 1:5 to 5:1, or from 1:2 to 2:1.

Para. 9. The aqueous fire-fighting foam concentrate of any of paras. 1 to 7, wherein the aliphatic alcohol-based component comprises an ethoxylate of a linear $C_{12}$-$C_{14}$-aliphatic alcohol having an average of no more than about 6 ethylene oxide units, or no more than about 4 ethylene oxide units.

Para. 10. The aqueous fire-fighting foam concentrate of any of paras. 1 to 9, wherein the aliphatic alcohol-based component comprises a lauryl alcohol ethoxylate having an average of no more than about 5 ethylene oxide units.

Para. 11. The aqueous fire-fighting foam concentrate of any of paras. 1 to 9, wherein the aliphatic alcohol-based component comprises a myristyl alcohol ethoxylate having an average of no more than about 5 ethylene oxide units.

Para. 12. The aqueous fire-fighting foam concentrate of any of paras. 1 to 6, wherein the aliphatic alcohol-based component comprises lauryl alcohol and a lauryl alcohol ethoxylate having an average of no more than about 5 ethylene oxide units.

Para. 13. The aqueous fire-fighting foam concentrate of any of paras. 3 to 6, wherein the concentrate comprises about 0.1 to 5 wt. % of the polysaccharide thickener.

Para. 14. The aqueous fire-fighting foam concentrate of any of paras. 1 to 13, wherein the surfactant component comprises an alkyl sulfate salt, an alkyl ether sulfate salt, an alkyl sulfonate salt, or a mixture of any two or more thereof.

Para. 15. The aqueous fire-fighting foam concentrate of any of paras. 1 to 13, wherein the surfactant component comprises one or more $C_8$-$C_{14}$-alkyl sulfate salts, $C_8$-$C_{14}$-alkyl ether sulfate salts, or a mixture of any two or more thereof.

Para. 16. The aqueous fire-fighting foam concentrate of any of paras. 1 to 15, wherein the surfactant component comprises octyl sulfate salt, decyl sulfate salt, lauryl sulfate salt, or a mixture of any two or more thereof.

Para. 17. The aqueous fire-fighting foam concentrate of any of paras. 1 to 16, wherein the concentrate comprises about 1 to 30 wt. % of the anionic surfactant, about 2 to 20 wt. % of the anionic surfactant, or about 5 to 15 wt. % of the anionic surfactant.

Para. 18. The aqueous fire-fighting foam concentrate of any of paras. 1 to 17, wherein the surfactant component comprises an alkyl polyglycoside nonionic surfactant.

Para. 19. The aqueous fire-fighting foam concentrate of para. 18, wherein the alkyl polyglycoside comprises an alkyl polyglucoside.

Para. 20. The aqueous fire-fighting foam concentrate of any of paras. 2 to 18, wherein the organic solvent comprises ethylene glycol, propylene glycol, or an alkyl carbitol.

Para. 21. The aqueous fire-fighting foam concentrate of any of paras. 2 to 20, wherein the organic solvent comprises propylene glycol and butyl carbitol.

Para. 22. The aqueous fire-fighting foam concentrate of any of paras. 2 to 19, wherein the organic solvent comprises diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, or a mixture of two or more thereof.

Para. 23. The aqueous fire-fighting foam concentrate of any of paras. 2 to 22, wherein the concentrate comprises about 1 to 30 wt. % of the organic solvent, about 5 to 25 wt. % of the organic solvent, about 10 to 25 wt. % of the organic solvent, or about 12-20 wt. % organic solvent.

Para. 24. The aqueous fire-fighting foam concentrate of any of paras. 1 to 23, further comprising a biocide, a corrosion inhibitor, or a mixture of any two or more thereof.

Para. 25. The foam concentrate of any of paras. 1 to 24, wherein the aliphatic alcohol-based component comprises an ethoxylate of a linear $C_{10}$-$C_{14}$-aliphatic alcohol having no more than about 3 ethylene oxide units.

Para. 26. The foam concentrate of any of paras. 1 to 25, wherein the concentrate comprises about 0.1 to 5 wt. % of the aliphatic alcohol-based component, about 0.5 to 2 wt. % of the aliphatic alcohol-based component, or about 0.7 to 2 wt. % of the aliphatic alcohol-based component.

Para. 27. The aqueous fire-fighting foam concentrate of any of paras. 2 to 4, wherein the polysaccharide thickener comprises agar, sodium alginate, carrageenan, gum arabic, gum guaiacum, neem gum, *Pistacia lentiscus*, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, gellan gum, xanthan gum, succinoglycan, acacia gum, cassia gum, diutan gum, fenugreek gum, ghatti gum, hydroxyethylcellulose, hydroxypropylmethylcellulose, karaya gum, konjac gum, pectin, propylene glycol alginate, or a mixture of any two or more thereof.

Para. 28. The aqueous fire-fighting foam concentrate of any of paras. 2 to 4, wherein the polysaccharide thickener comprises xanthan gum, diutan gum, rhamsan gum, welan gum, gellan gum, succinoglycan, guar gum, konjac gum, tara gum, methylcellulose, or a mixture of any two or more thereof.

Para. 29. The aqueous fire-fighting foam concentrate of any of paras. 3 to 5, wherein the polysaccharide thickener comprises xanthan gum, succinoglycan, welan gum, diutan gum, rhamsan gum, or a mixture of any two or more thereof.

Para. 30. The aqueous fire-fighting foam concentrate of para. 1, comprising: about 1 to 50 wt. % of the surfactant component; about 0.2 to 5 wt. % of the aliphatic alcohol-based component; about 1 to 30 wt. % of the organic solvent; about 0.1 to 5 wt. % of the polysaccharide thickener; and at least about 50 wt. % water; wherein, the composition contains no more than 0.01 wt. % fluorinated compounds.

Para. 31. The aqueous fire-fighting foam concentrate of para. 1, comprising: about 5 to 15 wt. % of the anionic surfactant; about 3 to 10 wt. % of an alkyl polyglycoside nonionic surfactant; about 0.2 to 5 wt. % of the aliphatic alcohol-based component; about 10 to 25 wt. % of a water-miscible organic solvent; about 0.1 to 5 wt. % of a polysaccharide thickener; and at least about 50 wt. % water; wherein the composition contains no more than 0.01 wt. % fluorinated compounds.

Para. 32. The aqueous fire-fighting foam concentrate of para. 1, comprising: about 5 to 20 wt. % of a surfactant mixture of an octyl sulfate salt, a lauryl sulfate salt, and an alkyl polyglycoside surfactant; about 0.1 to 2 wt. % lauryl alcohol; about 0.1 to 2 wt. % ethoxylated lauryl alcohol; about 10 to 25 wt. % of a mixture of propylene glycol and butyl carbitol; about 0.5 to 4 wt. % of xanthan gum, succinoglycan, welan gum, diutan gum, or a mixture of any two or more thereof; and at least about 50 wt. % water; wherein the composition contains no more than 0.01 wt. % fluorinated compounds.

Para. 33. The aqueous fire-fighting foam concentrate of para. 1, comprising: about 5 to 20 wt. % of a surfactant mixture of an octyl sulfate salt, a lauryl sulfate salt, and an alkyl polyglycoside surfactant; about 0.1 to 2 wt. % lauryl alcohol; about 0.1 to 2 wt. % ethoxylated lauryl alcohol; about 10 to 25 wt. % of a mixture of propylene glycol and butyl carbitol; about 0.5 to 3 wt. % xanthan gum and diutan gum; and at least about 50 wt. % water; wherein the composition contains no more than 0.01 wt. % fluorinated compounds.

Para. 34. The aqueous fire-fighting foam concentrate of para. 1, comprising: about 5 to 20 wt. % of a surfactant mixture of an octyl sulfate salt, a lauryl sulfate salt, and an alkyl polyglycoside surfactant; about 0.1 to 2 wt. % lauryl alcohol; about 0.1 to 2 wt. % ethoxylated lauryl alcohol; about 10 to 25 wt. % of a mixture of propylene glycol and butyl carbitol; about 0.5 to 4 wt. % xanthan gum and succinoglycan; and at least about 50 wt. % water; wherein the composition contains no more than 0.01 wt. % fluorinated compounds.

Para. 35. An aqueous fire-fighting foam concentrate comprising: about 1-4 wt. % of a polysaccharide thickener comprises one or more of xanthan gum, welan gum, succinoglycan, and diutan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol and butyl carbitol; and at least about 50 wt. % water; wherein the composition contains no more than 0.01 wt. % fluorinated compounds.

Para. 36. An aqueous fire-fighting foam concentrate comprising: about 1-4 wt. % of a polysaccharide thickener comprising xanthan gum and diutan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol butyl carbitol; and at least about 50 wt. % water; wherein the composition contains no more than 0.01 wt. % fluorinated compounds.

Para. 37. An aqueous fire-fighting foam concentrate comprising: about 1-4 wt. % of a polysaccharide thickener comprising xanthan gum and succinoglycan; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; about 10-20 wt. % propylene glycol; butyl carbitol; and at least about 50 wt. % water; wherein the composition contains no more than 0.01 wt. % fluorinated compounds.

Para. 38. An aqueous fire-fighting foam concentrate comprising: about 1-4 wt. % of a polysaccharide thickener comprising xanthan gum and welan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol and butyl carbitol; and at least about 50 wt. % water; wherein the composition contains no more than 0.01 wt. % fluorinated compounds.

Para. 39. The aqueous fire-fighting foam concentrate of any one of paras. 1 to 38 further comprising a reducing agent.

Para. 40. The foam concentrate of para. 39, wherein the reducing agent comprises a sulfite salt.

Para. 41. The foam concentrate of para. 39 or 40, wherein the reducing agent comprises sodium sulfite, sodium metabisulfite, sodium bisulfite, or a mixture of any two or more thereof.

Para. 42. The foam concentrate of para. 39, 40, or 41, wherein the reducing agent is present from about 0.01 wt % to about 5 wt %, from about 0.05 wt % to about 3 wt %, or from about 0.1 wt % to about 1 wt %.

Para. 43. The aqueous fire-fighting foam concentrate of any one of paras. 1 to 42 further comprising a microfibrous cellulose.

Para. 44. The aqueous fire-fighting foam concentrate of para. 43, wherein the microfibrous cellulose includes a fermentation derived cellulose.

Para. 45. The aqueous fire-fighting foam concentrate of para. 43 or 44, wherein the microfibrous cellulose is derived from a microbial fermentation process.

Para. 46. The aqueous fire-fighting foam concentrate of any one of paras. 43-45, wherein the microfibrous cellulose includes cellulose derived from a bacterial fermentation process.

Para. 47. The aqueous fire-fighting foam concentrate of any one of paras. 43-46, wherein the microfibrous cellulose has an average fiber diameter of no more than about 10 μm. This may include no more than about 1 μm, or in some embodiments, from about 50 to 300 nm.

Para. 48. The aqueous fire-fighting foam concentrate of any one of paras. 43-47, wherein prior to incorporation into the composition the microfibrous cellulose is activated by combining a powdered microfibrous cellulose and optionally co-agent with water and mixing with high shear.

Para. 49. The aqueous fire-fighting foam concentrate of any one of paras. 43-48, which includes about 0.1 to 5 wt. %, or about 0.5 to 3 wt. %, of a suspension agent.

Para. 50. An aqueous fire-fighting foam concentrate comprising: about 1-4 wt. % of a polysaccharide thickener comprises one or more of xanthan gum, welan gum, succinoglycan, and diutan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol and butyl carbitol; and at least about 50 wt. % water; wherein the composition contains no more than 0.01 wt. % fluorinated compounds.

Para. 51. An aqueous fire-fighting foam concentrate comprising: about 1-4 wt. % of a polysaccharide thickener comprising xanthan gum and diutan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol butyl carbitol; and at least about 50 wt. % water; wherein the composition contains no more than 0.01 wt. % fluorinated compounds.

Para. 52. An aqueous fire-fighting foam concentrate comprising: about 1-4 wt. % of a polysaccharide thickener comprising xanthan gum and succinoglycan; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; about 10-20 wt. % propylene glycol; butyl carbitol; and at least about 50 wt. % water; wherein the composition contains no more than 0.01 wt. % fluorinated compounds.

Para. 53. An aqueous fire-fighting foam concentrate comprising: about 1-4 wt. % of a polysaccharide thickener comprising xanthan gum and welan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol and butyl carbitol; and at least about 50 wt. % water; wherein the composition contains no more than 0.01 wt. % fluorinated compounds.

Para. 54. An aqueous fire-fighting foam concentrate comprising: about 1-4 wt. % of a polysaccharide thickener comprises one or more of xanthan gum, welan gum, succinoglycan, and diutan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol and butyl carbitol; about 0.1-1 wt % of sodium sulfite, sodium metabisulfite, sodium bisulfite, or a mixture of any two or more thereof; and at least about 50 wt. % water; wherein the composition contains no more than 0.01 wt. % fluorinated compounds.

Para. 55. An aqueous fire-fighting foam concentrate comprising: about 1-4 wt. % of a polysaccharide thickener comprising xanthan gum and diutan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol butyl carbitol; about 0.1-1 wt % of sodium sulfite, sodium metabisulfite, sodium bisulfite, or a mixture of any two or more thereof; and at least about 50 wt. % water; wherein the composition contains no more than 0.01 wt. % fluorinated compounds.

Para. 56. An aqueous fire-fighting foam concentrate comprising: about 1-4 wt. % of a polysaccharide thickener comprising xanthan gum and succinoglycan; about 5-15 wt. % of a $C_8$-$C_{12}$-alkyl sulfate anionic surfactant; about 3-15 wt. % of a $C_8$-$C_{10}$-alkyl polyglycoside nonionic surfactant;

about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; about 10-20 wt. % propylene glycol and butyl carbitol; about 0.1-1 wt % of sodium sulfite, sodium metabisulfite, sodium bisulfite, or a mixture of any two or more thereof; and at least about 50 wt. % water; wherein the composition contains no more than 0.01 wt. % fluorinated compounds.

Para. 57. An aqueous fire-fighting foam concentrate comprising: about 1-4 wt. % of a polysaccharide thickener comprising xanthan gum and welan gum; about 5-15 wt. % of a $C_8$-$C_{12}$-alkyl sulfate anionic surfactant; about 3-15 wt. % of a $C_8$-$C_{10}$-alkyl polyglycoside nonionic surfactant; about 0.5-5 wt. % of an aliphatic alcohol-based component comprising at least two of capryl alcohol, lauryl alcohol, and a lauryl alcohol ethoxylate having an average of about 1 to 4 ethylene oxide units; about 10-20 wt. % propylene glycol and butyl carbitol; about 0.1-1 wt % of sodium sulfite, sodium metabisulfite, sodium bisulfite, or a mixture of any two or more thereof; and at least about 50 wt. % water; wherein the composition contains no more than 0.01 wt. % fluorinated compounds.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A firefighting foam composition comprising:

a surfactant component comprising an anionic surfactant, a zwitterionic surfactant, optionally a nonionic surfactant, or a mixture of any two or more thereof;

an aliphatic alcohol-based component comprising an ethoxylate of a $C_{10}$-$C_{14}$-aliphatic alcohol having an average of no more than about 6 ethylene oxide units or a mixture of an $C_8$-$C_{14}$-aliphatic alcohol and an ethoxylate of $C_{10}$-$C_{14}$-aliphatic alcohols having an average of no more than about 6 ethylene oxide units;

a sugar component comprising fructose, glucose, or a mixture thereof;

at least about 30 wt. % water; and an agent that is a biocide, a corrosion inhibitor, a reducing agent, a microfibrous cellulose, or a mixture of any two or more thereof.

2. The firefighting foam composition of claim 1 comprising:

about 2 to 50 wt. % of the surfactant component;

about 0.1 to 10 wt. % of the aliphatic alcohol-based component; and at least about 50 wt. % water; and further comprising about 1 to 30 wt. % of a water-miscible organic solvent.

3. The firefighting foam composition of claim 1 further comprising a polysaccharide thickener and a water-miscible organic solvent.

4. The firefighting foam composition of claim 1 further comprising a reducing agent.

5. The firefighting foam composition of claim 1, comprising:

about 0.1 to 5 wt. % of a polysaccharide thickener;

about 5 to 50 wt. % of a surfactant component comprising two or more of an anionic surfactant, a zwitterionic surfactant, and optionally a nonionic surfactant;

about 0.1 to 5 wt. % of the aliphatic alcohol-based component;

about 12-15 wt. % of the sugar component;

about 1 to 30 wt. % of a water-miscible organic solvent; and at least about 50 wt. % water.

6. The firefighting foam composition of claim 1, wherein the aliphatic alcohol-based component comprises an ethoxylate of a linear $C_{12}$-$C_{14}$-aliphatic alcohol having an average of no more than about 6 ethylene oxide units.

7. The firefighting foam composition of claim 1, wherein the aliphatic alcohol-based component comprises a lauryl alcohol ethoxylate or a myristyl alcohol ethoxylate having an average of no more than about 5 ethylene oxide units.

8. The firefighting foam composition of claim 1, wherein the surfactant component comprises an alkyl sulfate salt, an alkyl ether sulfate salt, an alkyl sulfonate salt, or a mixture of any two or more thereof.

9. The firefighting foam composition of claim 1, wherein the surfactant component comprises octyl sulfate salt, decyl sulfate salt, lauryl sulfate salt, or a mixture of any two or more thereof.

10. The firefighting foam composition of claim 1, wherein the concentrate comprises about 1 to 30 wt. % of anionic surfactant.

11. The firefighting foam composition of claim 1, wherein the surfactant component comprises an alkyl polyglycoside nonionic surfactant.

12. The firefighting foam composition of claim 11, wherein the alkyl polyglycoside comprises an alkyl polyglucoside.

13. The firefighting foam composition of claim 2, wherein the organic solvent comprises diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, or a mixture of two or more thereof.

14. The firefighting foam composition of claim 1, wherein the agent is a biocide, a corrosion inhibitor, a microfibrous cellulose, or a mixture of any two or more thereof.

15. The firefighting foam composition of claim 3, wherein the polysaccharide thickener comprises agar, sodium alginate, carrageenan, gum arabic, gum guaiacum, neem gum, *Pistacia lentiscus*, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, gellan gum, xanthan gum, succinoglycan, acacia gum, cassia gum, diutan gum, fenugreek gum, ghatti gum, hydroxyethylcellulose, hydroxypropylmethylcellulose, karaya gum, konjac gum, pectin, propylene glycol alginate, or a mixture of any two or more thereof.

16. The firefighting foam composition of claim 3, wherein the polysaccharide thickener comprises xanthan gum, diutan gum, rhamsan gum, welan gum, gellan gum, succinoglycan, guar gum, konjac gum, tara gum, methylcellulose, or a mixture of any two or more thereof.

17. The firefighting foam composition of claim 1, wherein the aliphatic alcohol-based component comprises an ethoxylate of a linear $C_{12}$-$C_{14}$-aliphatic alcohol having an average of no more than about 4 ethylene oxide units.

18. The firefighting foam composition of claim 1, wherein the sugar component is a mixture of glucose and fructose.

* * * * *